(12) United States Patent
Murakami (10) Patent No.: US 11,745,555 B2
(45) Date of Patent: Sep. 5, 2023

(54) SHOCK ABSORBER

(71) Applicant: Hitachi Astemo, Ltd., Hitachinaka (JP)

(72) Inventor: Yosuke Murakami, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 83 days.

(21) Appl. No.: 17/541,990

(22) Filed: Dec. 3, 2021

(65) Prior Publication Data
US 2022/0088984 A1 Mar. 24, 2022

Related U.S. Application Data

(63) Continuation of application No. PCT/JP2019/041907, filed on Oct. 25, 2019.

(51) Int. Cl.
| | |
|---|---|
| *B60G 17/015* | (2006.01) |
| *B60G 11/16* | (2006.01) |
| *B60G 17/02* | (2006.01) |
| *B62K 25/10* | (2006.01) |
| *F16F 9/56* | (2006.01) |

(Continued)

(52) U.S. Cl.
CPC .............. *B60G 11/16* (2013.01); *B60G 17/02* (2013.01); *B62K 25/10* (2013.01); *F16F 9/46* (2013.01); *F16F 9/56* (2013.01); *G01D 11/30* (2013.01); *B60G 2300/12* (2013.01); *B60G 2500/30* (2013.01)

(58) Field of Classification Search
CPC .... B60G 11/16; B60G 17/02; B60G 2300/12; B60G 2500/30; B62K 25/10; F16F 9/46; F16F 9/56; G01D 11/30
See application file for complete search history.

(56) References Cited

U.S. PATENT DOCUMENTS 10,549,848 B2 * 2/2020 Klim ...................... B64C 25/58
2010/0252972 A1 * 10/2010 Cox ............................ F16F 9/56
267/286

(Continued)

FOREIGN PATENT DOCUMENTS

| JP | 60053478 A | 3/1985 |
|---|---|---|
| JP | 2009255691 A | 11/2009 |

(Continued)

OTHER PUBLICATIONS

International Search Report dated Dec. 17, 2019 for the corresponding PCT International Patent Application No. PCT/JR2019/041907.

(Continued)

*Primary Examiner* — Toan C To
(74) *Attorney, Agent, or Firm* — Leason Ellis LLP; Edward J. Ellis; Melvin C. Garner (57) ABSTRACT

A shock absorber includes a cylinder, a spring, a receiving member, a sensor, and a coupling member. The sensor includes a coil portion, and a core portion. The coupling member is formed integrally with the core portion. A recessed portion is formed in one of the receiving member and the coupling member, a protruding portion facing the recessed portion is formed in the other one of the receiving member and the coupling member, and the receiving member and the coupling member are coupled to each other via the recessed portion and the protruding portion.

20 Claims, 9 Drawing Sheets

(51) Int. Cl.
*G01D 11/30* (2006.01)
*F16F 9/46* (2006.01)

(56) References Cited

U.S. PATENT DOCUMENTS

| | | | |
|---|---|---|---|
| 2011/0012317 A1* | 1/2011 | Mouri | F16F 9/56 |
| | | | 280/5.519 |
| 2014/0084555 A1 | 3/2014 | Murakami | |
| 2016/0280315 A1 | 9/2016 | Murakami | |
| 2018/0354333 A1* | 12/2018 | Harrison | F16K 11/14 |
| 2018/0354335 A1* | 12/2018 | Harrison | F16K 11/14 |
| 2019/0047349 A1 | 2/2019 | Hayashiguchi et al. | |
| 2019/0105958 A1 | 4/2019 | Mochizuki | |
| 2021/0061044 A1* | 3/2021 | Park | B60G 11/26 |

FOREIGN PATENT DOCUMENTS

| | | | |
|---|---|---|---|
| JP | 2014065390 A | 4/2014 | |
| JP | 2016185735 A | 10/2016 | |
| JP | 2017141917 A | 8/2017 | |
| JP | 2017180476 A | 10/2017 | |
| JP | 6657490 B1 * | 3/2020 | B60G 11/16 |

OTHER PUBLICATIONS

Written Opinion dated Dec. 17, 2019 for the corresponding PCT International Patent Application No. PCT/JP2019/041907.
International Search Report dated Sep. 3, 2019 for the corresponding PCT International Patent Application No. PCT/JP2019/028136.
Written Opinion dated Sep. 3, 2019 for the corresponding PCT International Patent Application No. PCT/JP2019/028136.

* cited by examiner

SHOCK ABSORBER

CROSS-REFERENCE TO RELATED APPLICATION(S)

This application is a continuation of PCT application No. PCT/JP2019/041907 filed on Oct. 25, 2019, which claims the benefit of priority to International Patent Application No. PCT/JP2019/028136 filed on Jul. 17, 2019, the contents of which are incorporated herein by reference in their entities.

FIELD OF THE INVENTION

The present invention relates to a shock absorber which generates a damping force when a piston is displaced.

BACKGROUND OF THE INVENTION

A shock absorber is generally mounted on a straddle type vehicle such as a two-wheel vehicle. In the shock absorber, a piston is provided in a cylinder, and the piston generates a damping force when the piston is displaced due to unevenness of a road surface or the like. JP-A-60-53478 discloses a technique serving as a technique in the related art related to such a shock absorber.

The shock absorber disclosed in JP-A-60-53478 is used in a motorcycle or the like, and is provided with a detection unit including a sensor for detecting a displacement of a vehicle height.

According to the shock absorber disclosed in JP-A-60-53478, since the shock absorber includes the sensor, the displacement of the vehicle height can be detected.

SUMMARY OF THE INVENTION

The shock absorber is a device which repeats expansion and contraction, and a load is applied to the sensor used in the shock absorber. An object of the present invention is to provide a shock absorber which can reduce a load which may be applied to the sensor.

As a result of intensive studies, the present inventors have found that (1) a coupling member is disposed between a receiving member receiving a spring and a sensor, and the receiving member and the sensor are coupled to each other via the coupling member, and (2) the coupling member allows a movement of the sensor along a circumferential direction of the receiving member and allows a movement of the sensor along an axial direction, so that a load which may be applied to the sensor can be reduced. The present invention is completed based on this finding.

Hereinafter, the present invention will be described.

According to a first aspect of the present invention, there is provided a shock absorber including:

a cylinder provided with a piston which is movable along an axis inside the cylinder;

a spring provided coaxially with the cylinder;

a receiving member receiving the spring and provided to be movable in an axial direction of the cylinder;

a sensor configured to detect a position of the receiving member; and a coupling member coupling the receiving member and the sensor, allowing rotation of the receiving member around the axis, and allowing a movement of the sensor along the axial direction in which:

the sensor includes a coil portion formed by winding a conductive wire, a movement of the coil portion being restricted, and a core portion being movable along the axis together with the coupling member, at least a part of the core portion facing an inner side of the coil portion;

the coupling member is formed integrally with the core portion; and a recessed portion is formed in one of the receiving member and the coupling member, a protruding portion facing the recessed portion is formed in the other one of the receiving member and the coupling member, and the receiving member and the coupling member are coupled to each other via the recessed portion and the protruding portion.

The receiving member may include a first flange portion which is the protruding portion formed into an annular shape around the axis, the coupling member may include a first recessed portion which is the recessed portion formed into a recessed shape to surround an outer edge of the first flange portion, and the core portion may be held by the first flange portion via the first recessed portion.

The receiving member may include a second recessed portion over a circumferential direction, the second recessed portion being the recessed portion formed into a recessed shape toward a center on an outer circumferential edge of the receiving member, the coupling member may include a second flange portion being the protruding portion, protruding toward the second recessed portion, and a tip end of the coupling member facing the second recessed portion, and the core portion may be held by the second recessed portion via the second flange portion.

The sensor may be disposed outside the cylinder.

The core portion may have a circular cross-sectional shape whose normal direction is an axial direction of the core portion.

The sensor may include a guide portion configured to guide a movement of the core portion along the axial direction of the core portion, and the core portion may be disposed between the guide portion and the cylinder.

The guide portion may be disposed at a distance apart from the cylinder, and the distance may be smaller than a width of the core portion in a radial direction of the cylinder.

According to a second aspect of the present invention, there is provided a shock absorber including:

a cylinder provided with a piston which is movable along an axis inside the cylinder;

a spring provided coaxially with the cylinder and provided outside the cylinder;

a receiving member disposed outside the cylinder, receiving the spring, provided to be movable in an axial direction, and including a first flange portion formed into an annular shape around the axis;

a sensor disposed outside the cylinder and configured to detect a position of the receiving member; and a coupling member coupling the receiving member and the sensor, including a first recessed portion formed to surround an outer edge of the first flange portion to allow rotation of the receiving member around the axis, and allowing a movement of the sensor along the axial direction, in which:

the sensor includes a coil portion formed by winding a conductive wire, and disposed outside the cylinder, a movement of the coil portion being restricted, a core portion having a circular cross-sectional shape whose normal direction is an axial direction of the core portion, integrally formed with the coupling member, and being movable along the axis, at least a part of the core portion facing an inner side of the coil portion; and a guide portion disposed to sandwich the core portion together with the cylinder and guiding a movement of the core portion along the axial direction of the core portion.

According to a third aspect of the present invention, there is provided a shock absorber including:

a cylinder provided with a piston which is movable along an axis inside the cylinder;

a spring provided coaxially with the cylinder and provided outside the cylinder;

a receiving member disposed outside the cylinder, receiving the spring, provided to be movable in an axial direction, and including a second recessed portion formed into a recessed shape toward the axis;

a sensor disposed outside the cylinder and configured to detect a position of the receiving member, and a coupling member coupling the receiving member and the sensor, including a second flange portion, a tip end of the flange portion protruding to face the second recessed portion to allow rotation of the receiving member around the axis and allow a movement of the sensor along the axial direction, in which:

the sensor includes a coil portion formed by winding a conductive wire, and disposed outside the cylinder, a movement of the coil portion being restricted, a core portion having a circular cross-sectional shape whose normal direction is an axial direction of the core portion, integrally formed with the coupling member, and being movable along the axis, at least a part of the core portion facing an inner side of the coil portion, and a guide portion disposed to sandwich the core portion together with the cylinder and guiding a movement of the core portion along the axial direction of the core portion.

According to the present invention, it is possible to provide a shock absorber which can reduce a load which may be applied to a sensor.

DETAILED DESCRIPTION OF THE INVENTION

Embodiments of the present invention will be described below with reference to the accompanying drawings. In the description, left and right refer to left and right with respect to an occupant of a vehicle, and front and rear refer to front and rear with respect to a traveling direction of the vehicle. In the drawings, Up indicates an upper direction, and Dn indicates a lower direction. The embodiments illustrated in the accompanying drawings are examples of the present invention, and the present invention is not limited to the embodiments.

First Embodiment

Figure 1:
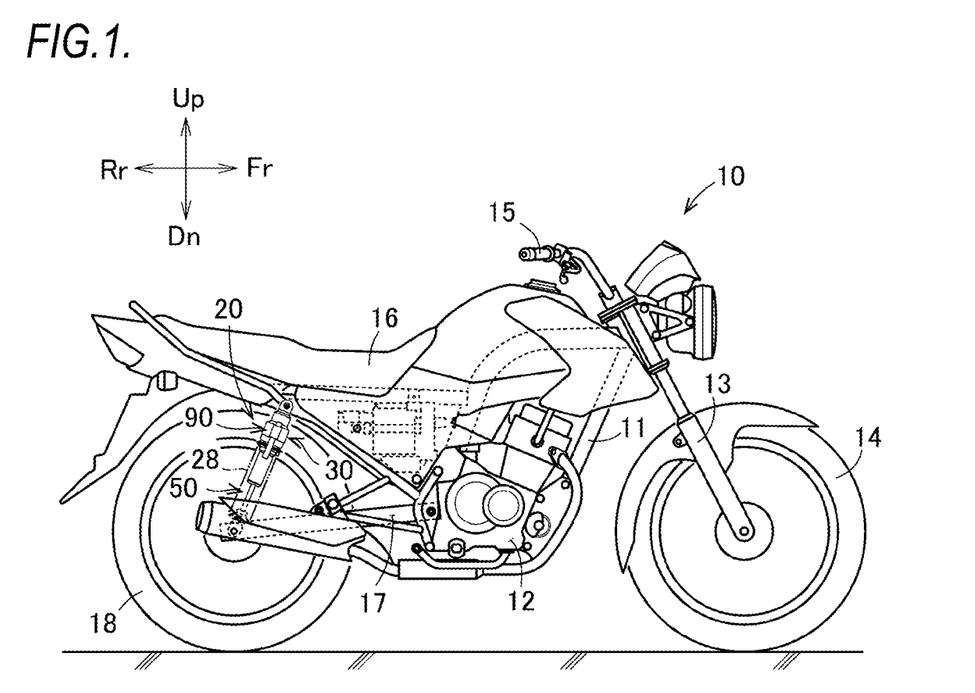
FIG. 1 is a side view illustrating a two-wheel vehicle on which a rear cushion according to a first embodiment is mounted.

Description will be made with reference to FIG. 1. A shock absorber according to the present invention can be used as a front fork 13 or a rear cushion 20. Hereinafter, the description will be made based on an example applied to the rear cushion 20 of a two-wheel vehicle 10 (an example in which the shock absorber according to the present invention is used as the rear cushion 20. Hereinafter, the rear cushion 20 may be referred to as a "shock absorber 20").

The two-wheel vehicle 10 (straddle type vehicle 10) includes a vehicle body 11, an engine 12 serving as a power source supported at a lower center portion of the vehicle body 11, left and right front forks 13 (only the right front fork 13 is illustrated in the drawing) provided at left and right sides of a front portion of the vehicle body 11 and absorb an impact received due to unevenness of a road surface, a front wheel 14 which is interposed between the front forks 13 and is rotatably supported, handle pipes 15 which are disposed at upper portions of the front forks 13 and steer the front wheel 14, a seat 16 provided above the engine 12 and on which an occupant sits, a swing arm 17 which extends from a rear portion of the vehicle body 11 to a rear side and which is swingable in an upper-lower direction, a rear wheel 18 which is rotatably supported by the swing arm 17, and left and right rear cushions 20 (only the right rear cushion 20 is illustrated in the drawing) which are provided to cross from a rear portion of the vehicle body 11 to the swing arm 17.

The left and right rear cushions 20 have the same configuration. Hereinafter, the right rear cushion 20 will be described, and the description of the left rear cushion will be omitted. The left and right rear cushions 20 may have different configurations depending on purposes.

An upper end of the shock absorber 20 is fixed to the vehicle body 11 and a lower end of the shock absorber 20 is fixed to the swing arm 17.

Description will be made with reference to FIG. 2. The shock absorber 20 includes a main body portion 30 which is located at an upper portion and is filled with oil, a rod unit 50 which is located at a lower portion and is provided to be able to move forward or backward relative to the main body portion 30, a spring 25 which biases the main body portion 30 and the rod unit 50 so as to separate the main body portion 30 and the rod unit 50 from each other, and an adjustment unit 60 which adjusts a preload by displacing a position of an upper end of the spring 25 in a height direction (an upper-lower direction).

The main body portion 30 includes a main body portion stay 31 of which an upper portion is connected to the vehicle body 11 (see FIG. 1) and a lower portion is formed into a cap shape, a cylindrical cylinder 40 of which an upper end is fastened to the main body portion stay 31, and a spring receiving portion 33 (a receiving member 33) which is provided at an outer side of the cylinder 40 to be able to move upward and downward and receives an upper end of the spring 25.

The rod unit 50 includes a rod side stay 51 fixed to the swing arm 17 (see FIG. 1), a substantially cylindrical piston rod 52 of which a lower end is fitted into the rod side stay 51, a piston 53 which is fixed to a tip end of the piston rod 52 and located inside the cylinder 40, and a spring receiving portion 54 which is fixed to the rod side stay 51 and receives a lower end of the spring 25.

The spring 25 is implemented by a compression coil spring.

The adjustment unit 60 includes a jack portion 70 which comes into contact with the spring receiving portion 33 and displaces the spring receiving portion 33 downward by a hydraulic pressure, a pump 80 which is connected to the jack portion 70 and can feed oil, a sensor 90 which can detect a position of the spring receiving portion 33 in an axial direction of the cylinder 40 (for example, a distance between a lower end of a plunger 72 to be described later and the spring receiving portion 33), an operation unit 64 for setting an adjustment amount of a preload, and a control unit 65 which operates the pump 80 based on information from the sensor 90 and the operation unit 64.

The cylinder 40 includes an upper lid portion 41 to which the main body portion stay 31 is fixed, a cylinder main body 42 which is screwed to an inner circumference of the upper lid portion 41 and of which an upper end is closed, a lower lid portion 43 which closes a lower end of the cylinder main body 42, and an extension portion 44 which is integrally formed with the upper lid portion 41 and extends from the upper lid portion 41 along an outer circumferential surface of the cylinder main body 42.

The extension portion 44 includes a sensor holding portion 44a which bulges outward in a radial direction of the cylinder and holds the sensor 90. That is, it can be said that the sensor holding portion 44a is integrally formed with the cylinder 40.

Figure 3:
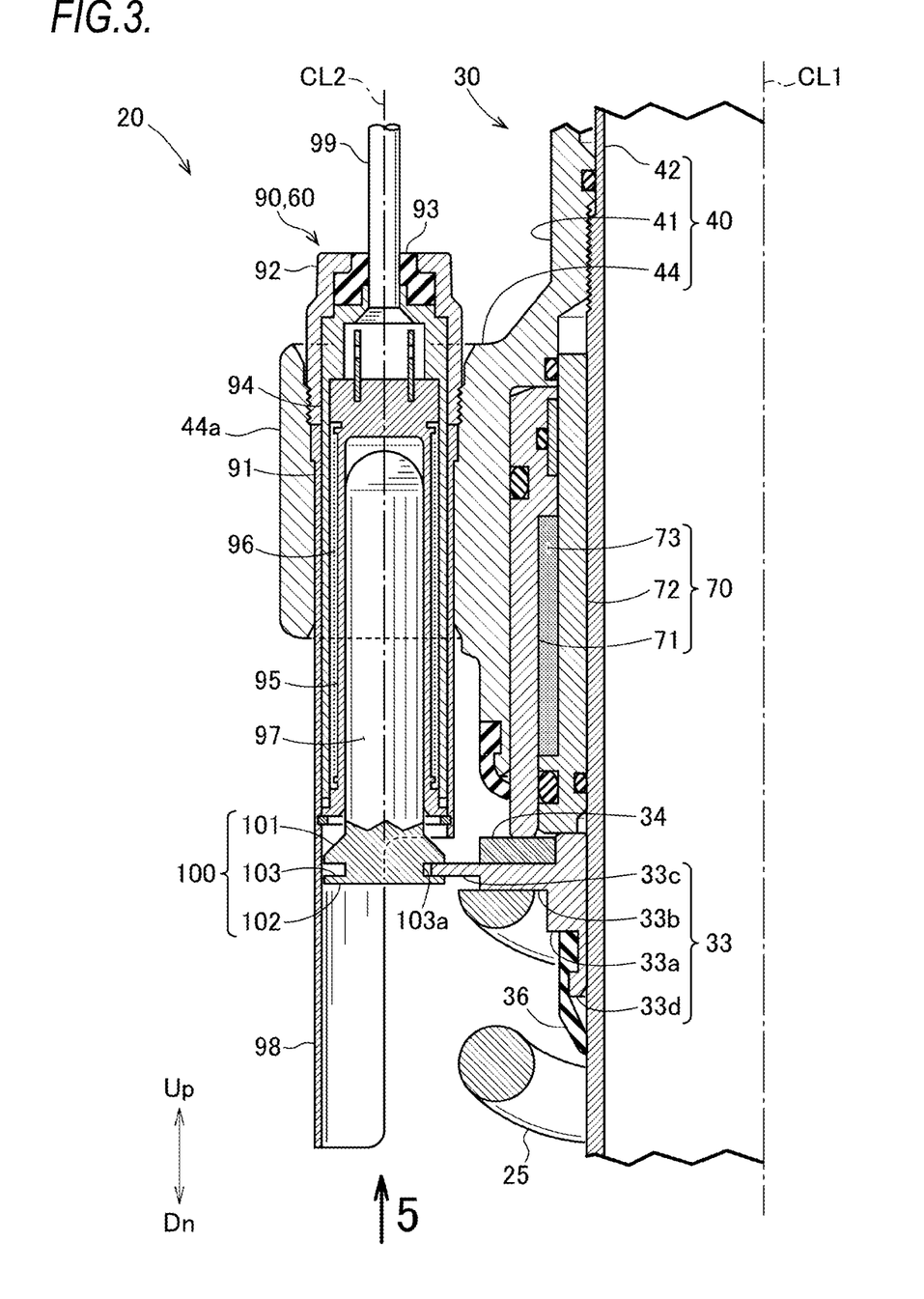
FIG. 3 is an enlarged view illustrating a main part of the rear cushion illustrated in FIG. 2.

Description will be made with reference to FIG. 3. The spring receiving portion 33 can move relative to the outer circumferential surface of the cylinder main body 42 along an axis CL1, and is provided to be rotatable around the axis CL1. The spring receiving portion 33 includes a cylindrical base portion 33a disposed along the outer circumferential surface of the cylinder main body 42, a spring receiving main body 33b which is a plate-shaped annular portion protruding from the base portion 33a toward an outer side in the radial direction of the cylinder 40 and which comes into contact with an upper end of the spring 25, a first flange portion 33c (a protruding portion 33c) which is formed adjacent to the spring receiving main body 33b and of which an outer edge is connected to the sensor 90 via a coupling member 100 to be described later, and a claw portion 33d which extends downward from a lower end of the base portion 33a and of which a lower end is formed into a claw shape.

A contact member 34 which can come into contact with the jack portion 70 is fixed to an outer side of an upper end of the base portion 33a. The upper end of the base portion 33a is located above an upper surface of the contact member 34.

The first flange portion 33c is a plate-shaped member formed into an annular shape in a similar manner to the spring receiving main body 33b. A thickness of the first flange portion 33c (a thickness in the axial direction of the cylinder 40. The same applies hereinafter.) is smaller than a thickness of the spring receiving main body 33b. Therefore, the first flange portion 33c is easily bent in the upper-lower direction.

A seal member 36 is attached to the claw portion 33d. The seal member 36 is a member for preventing dust from entering between the spring receiving portion 33 and the cylinder main body 42 (the cylinder 40).

Description will be made with reference to FIG. 2. The piston rod 52 is provided to be movable along the axis CL1 inside the cylinder main body 42. A downward force is applied to the piston rod 52 by the spring 25 so as to separate the piston rod 52 from the cylinder 40. An upper end of the piston rod 52 faces an inner side of the cylinder 40.

The piston 53 is configured such that oil can pass through an inner side of the piston 53, and the piston 53 is movable in the upper-lower direction in the cylinder main body 42 together with the piston rod 52. When the piston 53 moves in the upper-lower direction along an inner wall of the cylinder main body 42, oil passes through the inner side of the piston 53, and a damping force is generated.

Description will be made with reference to FIG. 3. The jack portion 70 is housed in a space formed between the cylinder main body 42 and the extension portion 44. The jack portion 70 includes a jack housing 71 fixed along an inner circumferential surface of the extension portion 44, a plunger 72 which is provided in a manner in which the plunger 72 can be lifted and lowered along an outer circumferential surface of the cylinder main body 42 and of which a lower end comes into contact with an upper surface of the base portion 33a, and a jack chamber 73 which is a region surrounded by the jack housing 71 and the plunger 72 and is filled with oil fed from the pump 80 (see FIG. 2).

Description will be made with reference to FIG. 2 as well. The pump 80 is a liquid feed pump for feeding oil to the jack chamber 73. The pump 80 includes a motor 81, a pump case 82 filled with oil, and an adjustment unit 83 of which a tip end is positioned at the pump case 82 and which can be lifted and lowered by operating the motor 81.

Figure 2:
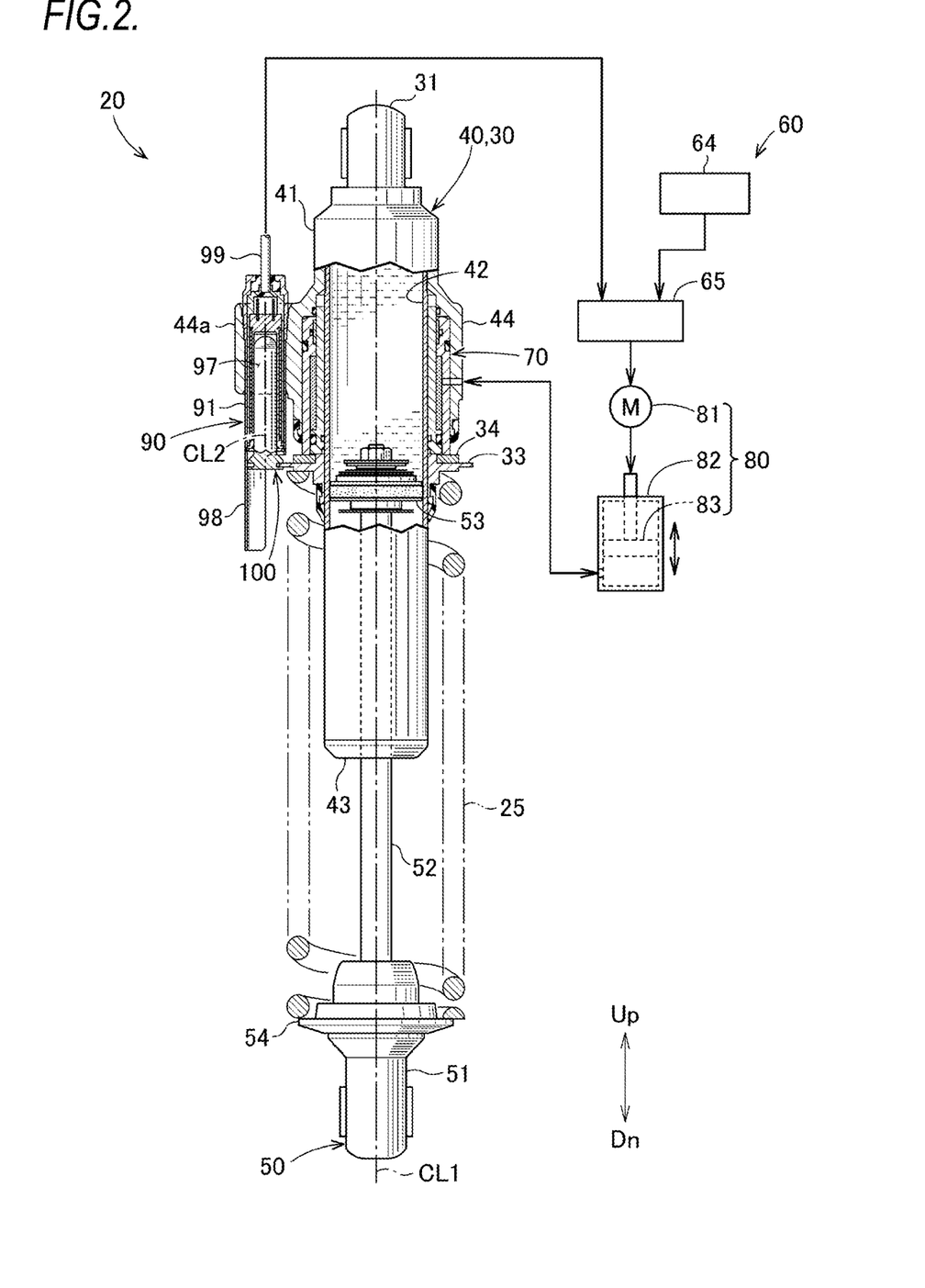
FIG. 2 is a view illustrating the rear cushion illustrated in FIG. 1.

The sensor 90 includes a sensor main body 91 which is formed into a substantially cylindrical shape and is held by the sensor holding portion 44a, a fixed lid portion 92 which is fastened to an inner periphery of the sensor holding portion 44a and prevents the sensor main body 91 from coming off, a seal member 93 which is provided inside an upper end of the fixed lid portion 92 and prevents dust from entering the sensor 90, a sensor outer cylinder portion 94 which is positioned below the seal member 93 and is fixed along inner circumferential surfaces of the sensor main body 91 and the fixed lid portion 92, a bottomed cylindrical sensor inner cylinder portion 95 which is provided along an inner circumferential surface of the sensor outer cylinder portion 94, a coil portion 96 which is formed of a conductive wire wound around an outer side of the sensor inner cylinder portion 95, a core portion 97 which is provided to be movable upward and downward inside the sensor inner cylinder portion 95, a guide portion 98 which extends further downward from a lower end of the sensor main body 91 and guides a movement of the core portion 97 in the upper-lower direction, and a hardness 99 of which an outer circumferential surface is held by the seal member 93 and which is connected to the control unit 65 (see FIG. 2).

The sensor main body 91 can be inserted into the sensor holding portion 44a from above the sensor holding portion 44a. The sensor main body 91 is a member in which an outer diameter of an upper end is larger than an outer diameter of other portions. The upper end of the sensor main body 91 is supported by a protruding portion which protrudes inward from an inner circumferential surface of the sensor holding portion 44a, thereby preventing the sensor main body 91 from falling downward. An axis CL2 of the sensor main body 91 extends parallel to the axis CL1 of the cylinder 40.

A part of an outer circumferential surface of the fixed lid portion 92 is formed into a male screw shape, and is fastened to an inner circumferential surface of the sensor holding portion 44a formed into a female screw shape.

The sensor inner cylinder portion 95 is fixed to an inner side of the sensor outer cylinder portion 94. Each of an upper end and a lower end of the sensor inner cylinder portion 95 protrudes outward in a radial direction of the sensor inner cylinder portion 95, and prevents the coil portion 96 from coming off.

The coil portion 96 is accommodated in a space formed between the sensor outer cylinder portion 94 and the sensor inner cylinder portion 95. The coil portion 96 can be energized.

The core portion 97 is formed into a substantially columnar shape, and a tip end of the core portion 97 is formed into a hemispherical shape. The core portion 97 is provided to be movable along the axis CL2. Since the axis CL2 is parallel to the axis CL1, it can be said that the core portion 97 is movable along the axis CL1. The coupling member 100 coupled to the spring receiving portion 33 is formed integrally with the core portion 97 at a lower end of the core portion 97.

The coupling member 100 includes an enlarged diameter portion 101 which is continuously enlarged in diameter from a lower end of the core portion 97, a large diameter portion 102 which is continuous from the enlarged diameter portion 101 and has a diameter larger than a diameter of the core portion 97, and a first recessed portion 103 (a recessed portion 103) which is continuous in a circumferential direction of the large diameter portion 102 and is formed into a groove shape. The coupling member 100 is formed integrally with the core portion 97, and is a member separate from the spring receiving portion 33.

There is a gap between a bottom surface 103a of the first recessed portion 103 and an outer circumferential surface of the spring receiving portion 33.

Figure 4:
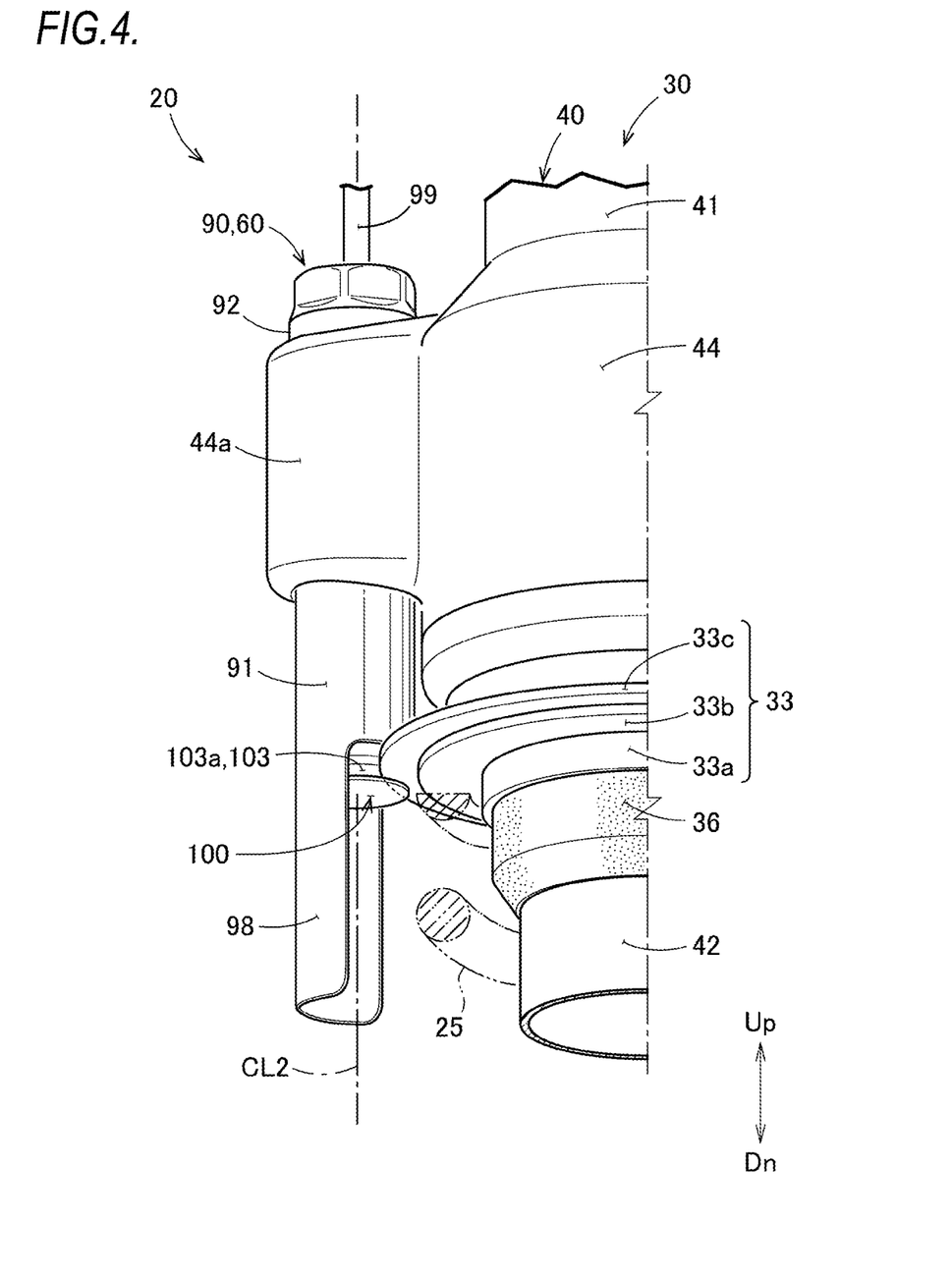
FIG. 4 is a perspective view illustrating the rear cushion illustrated in FIG. 2 as viewed from below.
Figure 5:
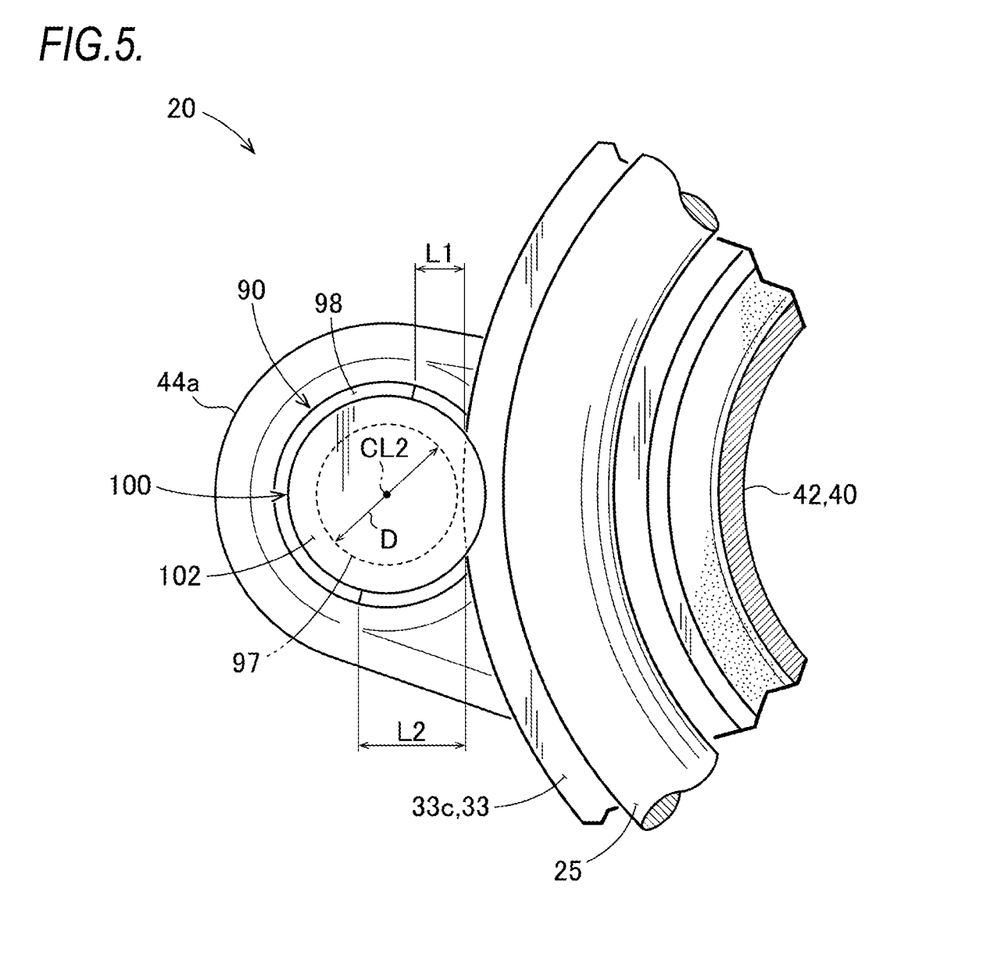
FIG. 5 is a view taken along an arrow 5 in FIG. 3.

Description will be made with reference to FIGS. 4 and 5. The guide portion 98 is a portion which has a substantially semicircular shape in a bottom view and surrounds an outer circumferential surface of the coupling member 100 over a substantially half circumference. The guide portion 98 opens toward the cylinder 40. It is preferable that the guide portion 98 surrounds a part of the outer circumferential surface of the coupling member 100 and a part of the outer circumferential surface of the core portion 97, and opens toward the cylinder 40. The reason will be described later.

Description will be made with reference to FIG. 5. The guide portion 98 is arranged at distances apart from the spring receiving portion 33. Distances L1 and L2 are smaller than a diameter D of the core portion 97.

Description will be made with reference to FIG. 2. The operation unit 64 is disposed, for example, at a side of a speedometer so that an occupant can operate the operation unit 64 in a riding posture.

A preload adjustment of the shock absorber 20 described above will be described.

Description will be made with reference to FIGS. 2 and 3. In the state illustrated in the drawing, an initial load is a smallest load. That is, the spring 25 is in a longest state. The occupant can increase the initial load in order to change ride comfort. The occupant operates the operation unit 64 to increase the initial load.

The control unit 65 which is received an electric signal from the operation unit 64 energizes the motor 81 to lower the adjustment unit 83. When the adjustment unit 83 is lowered, oil in the pump case 82 is fed into the jack chamber 73.

Figure 6:
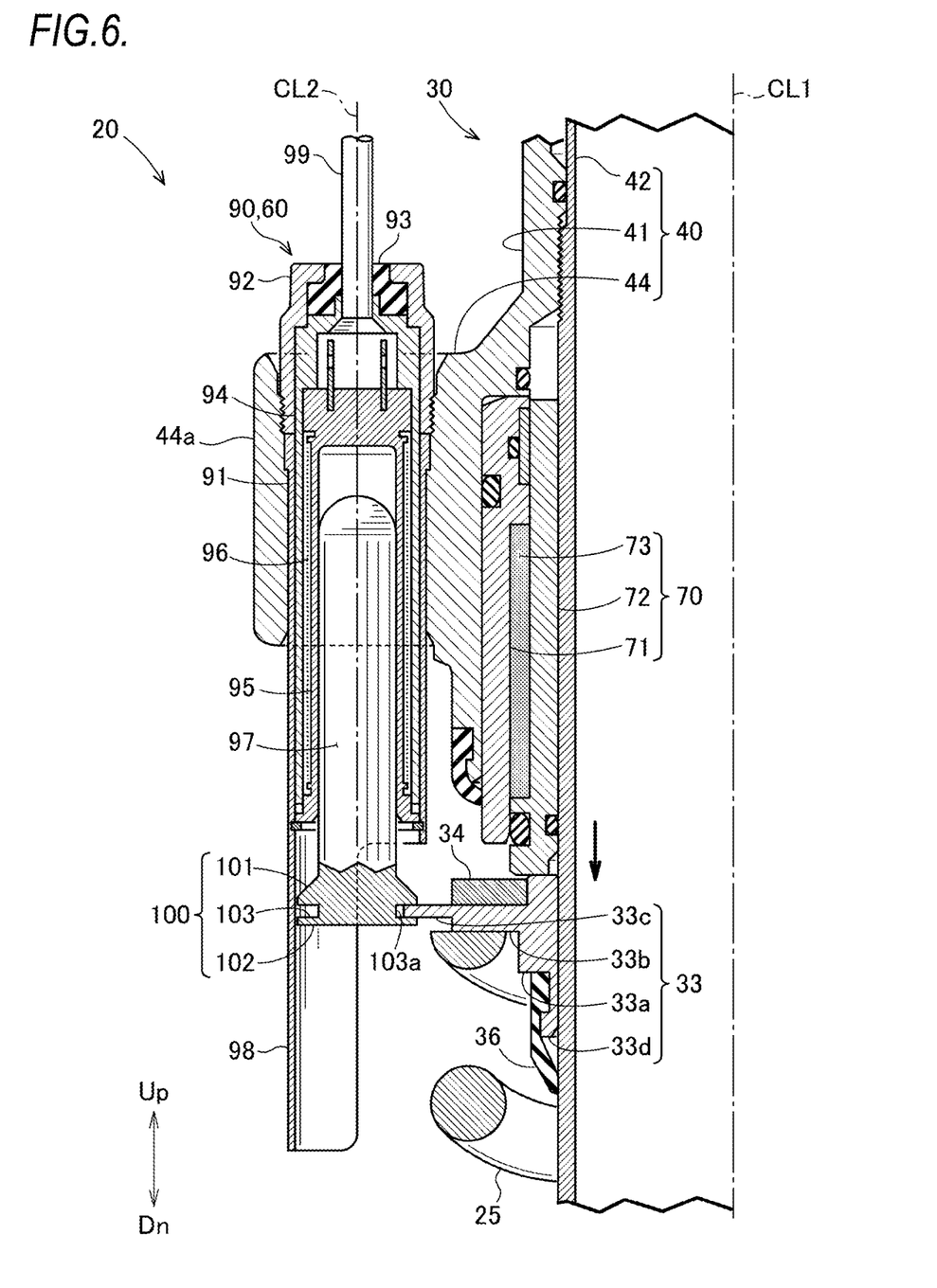
FIG. 6 is a view illustrating a function of the rear cushion illustrated in FIG. 3.

Description will be made with reference to FIGS. 3 and 6. The oil fed into the jack chamber 73 lowers the plunger 72 against a force of the spring 25. When the plunger 72 is lowered, the spring receiving portion 33 is pushed down, and the spring 25 is compressed. Accordingly, the initial load is increased. At this time, the jack housing 71 and the cylinder main body 42 do not move.

When the spring 25 is compressed, the spring receiving portion 33 and the core portion 97 are also lowered together with the spring receiving portion 33. An electromotive force induced in the coil portion 96 changes as the core portion 97 is lowered. Accordingly, a position of the spring receiving portion 33 in the axial direction of the cylinder 40, that is, a compression amount of the spring 25 can be detected.

Description will be made with reference to FIG. 2 as well. Information related to the position of the spring receiving portion 33 detected by the sensor 90 is sent to the control unit 65 as an electric signal. The control unit 65 continues to energize the motor 81 until the spring receiving portion 33 moves to a predetermined position. When the spring receiving portion 33 moves to the predetermined position, the control unit 65 ends the energization of the motor 81.

When the initial load is reduced, the control unit 65 operates the motor 81 so as to raise the adjustment unit 83. When the adjustment unit 83 is raised, the plunger 72 is pushed up by the force of the spring 25. When the plunger 72 is pushed up, oil in the jack chamber 73 is fed into the pump case 82. The position of the spring receiving portion 33 is detected by the sensor 90.

Description will be made with reference to FIGS. 4 and 5. A load in a twisting direction may be applied to the spring receiving portion 33 due to an influence of the spring 25 and the like. That is, a force in a rotation direction around the axis CL1 may be applied to the spring receiving portion 33. Since the coupling member 100 is provided to allow the rotation of the spring receiving portion 33 around the axis CL1, the force in the rotation direction can be released by idling the spring receiving portion 33.

The above can be summarized as follows.

Description will be made with reference to FIG. 2. The shock absorber 20 includes:

the cylinder 40 provided with the piston 53 which is movable along the axis CL1 inside the cylinder;

the spring 25 provided coaxially with the cylinder 40;

the spring receiving portion 33 receiving the spring 25 and provided to be movable in the axial direction of the cylinder 40;

the sensor 90 configured to detect a position of the spring receiving portion 33, and the coupling member 100 coupling the spring receiving portion 33 and the sensor 90, allowing the spring receiving portion 33 to rotate around the axis CL1, and allowing the sensor 90 to move along the axial direction.

The sensor 90 includes
  the coil portion 96 formed by winding a conductive wire, a movement of the coil portion 96 being restricted, and
  the core portion 97 being movable along the axis CL1 together with the coupling member 100, at least a part of the core portion 97 facing an inner side of the coil portion 96.

The coupling member 100 is integrally formed with the core portion 97.

With regard to the spring receiving portion 33 and the coupling member 100, the coupling member 100 is provided with the first recessed portion 103, the spring receiving portion 33 is provided with the first flange portion 33c facing the first recessed portion 103, and the spring receiving portion 33 and the coupling member 100 are coupled to each other via the first recessed portion 103 and the first flange portion 33c.

The coupling member 100 allows the spring receiving portion 33 to rotate around the axis CL1 and allows the core portion 97 (the sensor 90) to move along the axial direction. A load may be applied to the spring receiving portion 33 such that the spring receiving portion 33 is twisted in the circumferential direction of the cylinder 40 due to the influence of the spring 25 and the like. Since the coupling member 100 allows the rotation of the spring receiving portion 33 around the axis CL1, the load applied in the twisting direction can be released. Therefore, it is possible to reduce the load which may be applied to the core portion 97. That is, according to the present invention, it is possible to provide the shock absorber 20 (the rear cushion 20) which can reduce the load which may be applied to the sensor 90.

Further, the coupling member 100 is formed integrally with the core portion 97. Accordingly, the sensor 90 can be compactly disposed in the vicinity of the spring receiving portion 33.

Description will be made with reference to FIG. 3. The spring receiving portion 33 includes the first flange portion 33c formed into an annular shape around the axis CL1.

The coupling member 100 includes the first recessed portion 103 formed into a recessed shape to surround an outer edge of the first flange portion 33c.

The core portion 97 is held by the first flange portion 33c via the first recessed portion 103.

The outer edge of the first flange portion 33c is surrounded by the first recessed portion 103. Accordingly, the rotation of the spring receiving portion 33 around the axis CL1 can be allowed with a simple configuration. As a result, it is possible to provide the shock absorber 20 which can appropriately displace the core portion 97 while preventing a load from being applied to the core portion 97.

The sensor 90 is disposed outside the cylinder 40. As compared with the case where the sensor 90 is disposed inside the cylinder 40, maintenance of the shock absorber 20 can be easily performed. The shock absorber 20 can be used for a long period of time by improving maintainability while reducing a load which may be applied to the sensor 90.

The sensor 90 further includes the guide portion 98 which guides the movement of the core portion 97 along the axial direction. Wiring and the like of the sensor 90 can be simplified by arranging the coil portion 96 at a fixed side and arranging the core portion 97 at a moving side. Since the guide portion 98 is provided, the core portion 97 can be more reliably moved parallel to the axis CL1. Accordingly, it is possible to provide the shock absorber 20 which can improve the accuracy of position information to be detected.

Further, the core portion 97 has a circular cross-sectional shape whose normal direction is the axial direction of the core portion 97. Accordingly, the rotation of the spring receiving portion 33 around the axis CL1 is easily allowed. As a result, it is possible to provide the shock absorber 20 which easily reduces a load which may be applied to the core portion 97.

Description will be made with reference to FIG. 5. The core portion 97 is disposed between the guide portion 98 and the cylinder 40. Accordingly, the core portion 97 can be protected against flying stones, mud, and the like. As a result, it is possible to provide the shock absorber 20 which can further improve the protection performance of the sensor 90, in addition to the above effects.

Furthermore, the guide portion 98 is disposed at distances apart from the spring receiving portion 33, and the distances L1 and L2 are smaller than the diameter D of the core portion 97 in the radial direction of the cylinder 40.

Accordingly, it is possible to provide the shock absorber 20 in which the core portion 97 can be prevented from falling off from between the spring receiving portion 33 at the main body side and the guide portion 98, in addition to the above effects.

Second Embodiment

Next, a rear cushion (a shock absorber) according to a second embodiment will be described with reference to the drawings.

Figure 7:
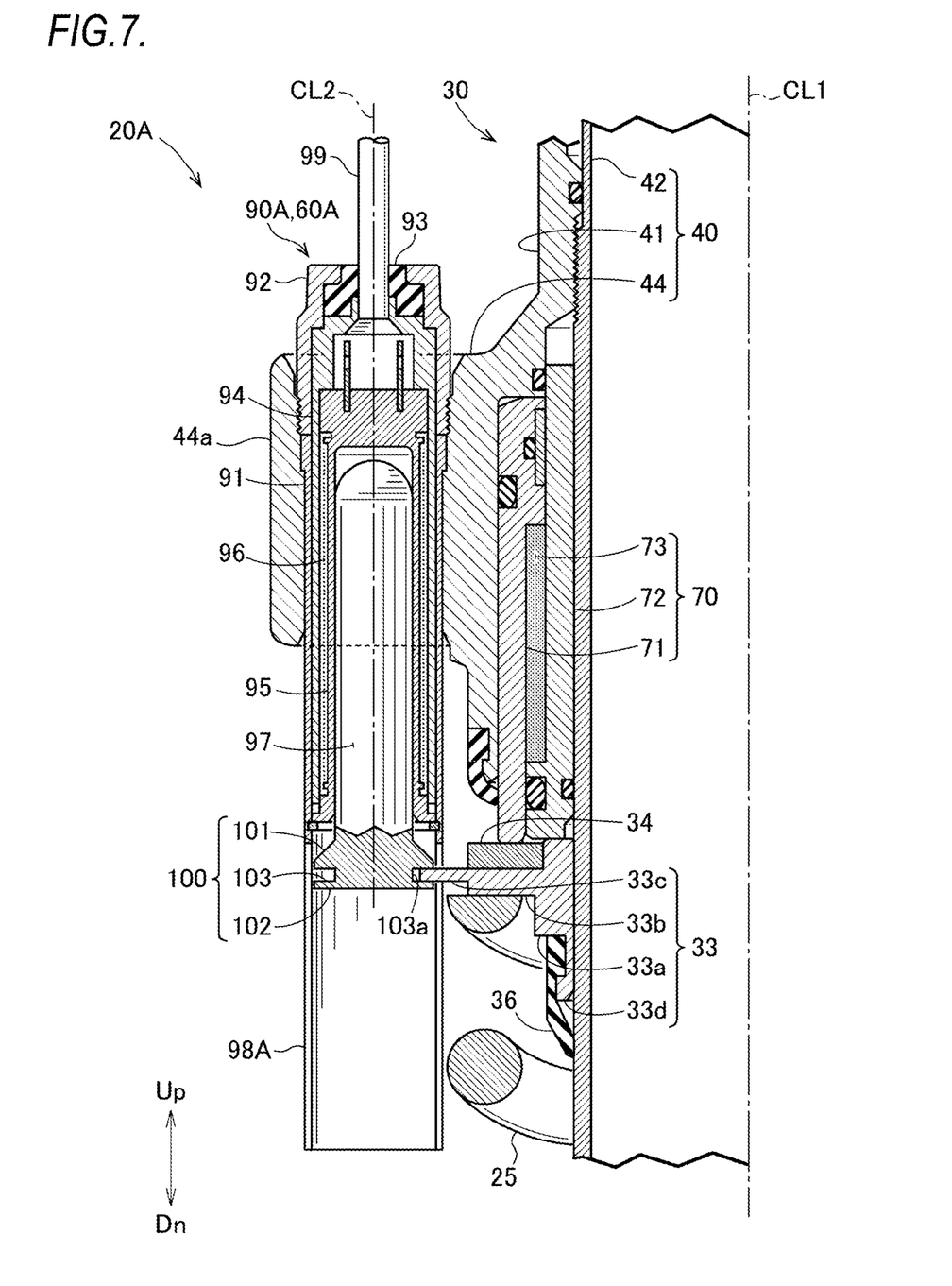
FIG. 7 is an enlarged view illustrating a main part of a rear cushion according to a second embodiment.

FIG. 7 illustrates a main part of a rear cushion 20A (hereinafter, may be referred to as a "shock absorber 20A") according to the second embodiment. The shock absorber 20A is different from the shock absorber 20 (see FIG. 3) in a position where a guide portion 98A is disposed. Other basic configurations are the same as those of the shock absorber 20. Components common to those of the shock absorber 20 will be denoted by the same reference numerals, and detailed description thereof will be omitted.

A sensor 90A constituting an adjustment unit 60A has a substantially semicircular guide portion 98A which guides the core portion 97. The guide portion 98A opens parallel to the cylinder 40.

The rear cushion 20A having the configuration described above also achieves the predetermined effects of the present invention.

Third Embodiment

Next, a rear cushion (shock absorber) according to a third embodiment will be described with reference to the drawings.

Figure 8:
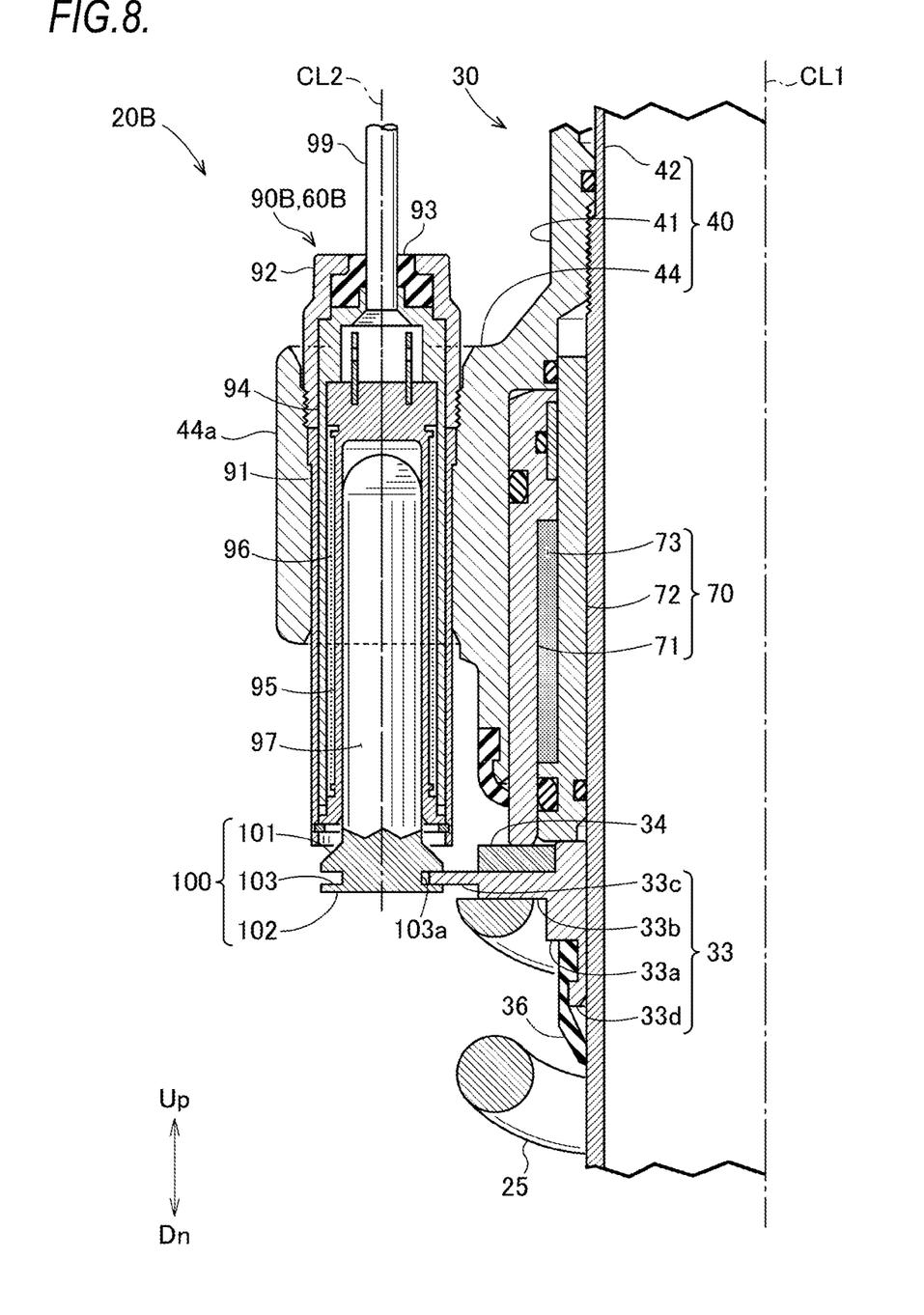
FIG. 8 is an enlarged view illustrating a main part of a rear cushion according to a third embodiment.

FIG. 8 illustrates a main part of a rear cushion 20B (hereinafter, may be referred to as a "shock absorber 20B") according to the third embodiment. The shock absorber 20B is different from the shock absorber 20 (see FIG. 4) in that the shock absorber 20B does not include the guide portion 98 (see FIG. 3). Other basic configurations are the same as those of the shock absorber 20. Components common to those of the shock absorber 20 will be denoted by the same reference numerals, and detailed description thereof will be omitted.

A sensor 90B constituting an adjustment unit 60B does not include a guide portion (see reference numeral 98 in FIG. 2) which guides the core portion 97.

The shock absorber 20B having the configuration described above also achieves the predetermined effects of the present invention.

Fourth Embodiment

Next, a rear cushion (shock absorber) according to a fourth embodiment will be described with reference to the drawings.

Figure 9:
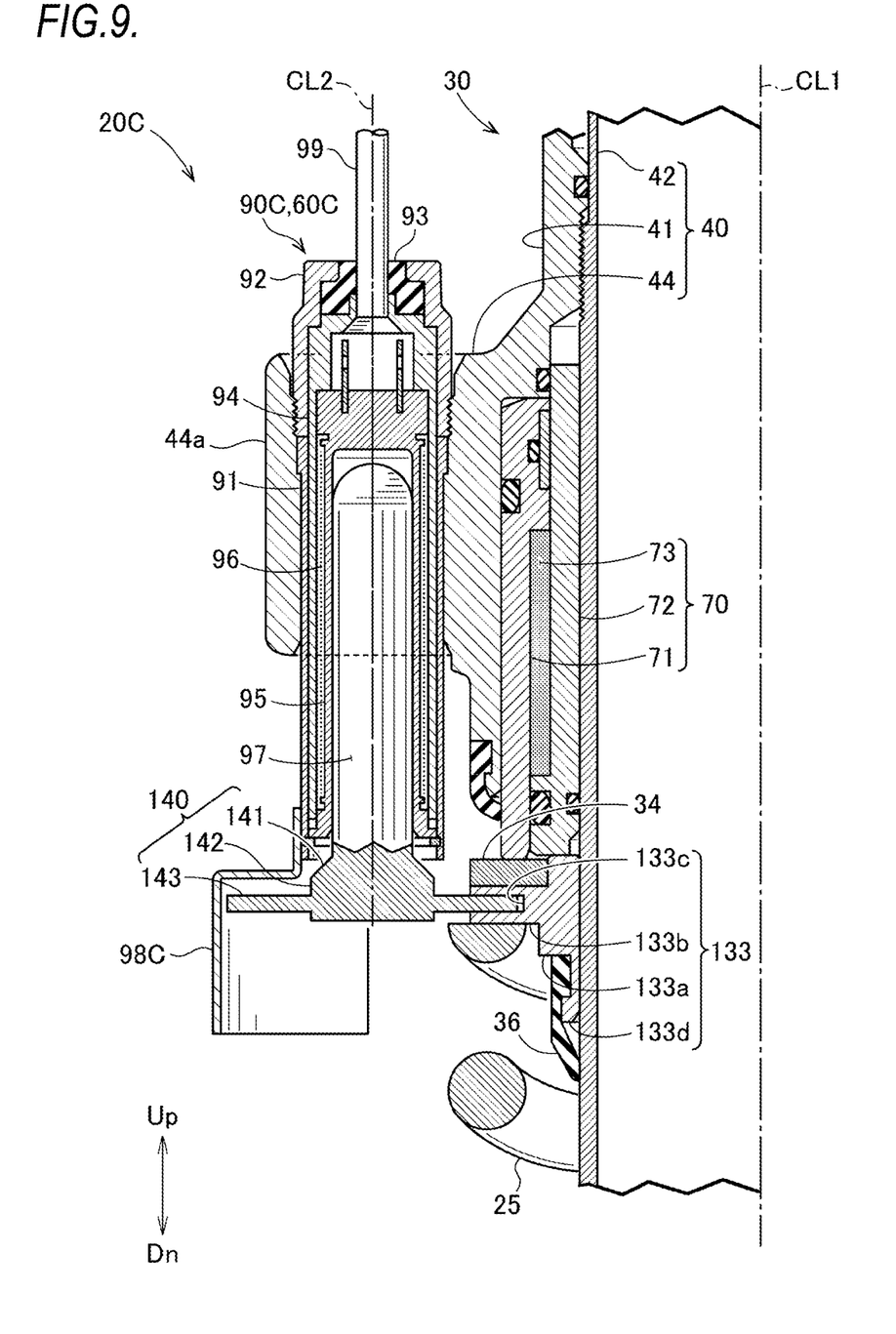
FIG. 9 is an enlarged view illustrating a main part of a rear cushion according to a fourth embodiment.

FIG. 9 illustrates a main part of a rear cushion 20C (hereinafter, may be referred to as a "shock absorber 20C") according to the fourth embodiment. A basic configuration of the rear cushion 20C is the same as that of the shock absorber 20. Components common to those of the shock absorber 20 will be denoted by the same reference numerals, and detailed description thereof will be omitted.

The rear cushion 20C includes a spring receiving portion 133 (a receiving member 133) which receives the spring 25, an adjustment unit 60C which adjusts a preload, and a coupling member 140 which couples the spring receiving portion 133 and a sensor 90C of the adjustment unit 60C.

The spring receiving portion 133 is movable along the axis CL1 relative to an outer circumferential surface of the cylinder main body 42, and is provided to be rotatable around the axis CL1. The spring receiving portion 133 includes a cylindrical base portion 133a disposed along the outer circumferential surface of the cylinder main body 42, a spring receiving main body 133b which is a plate-shaped annular portion protruding from the base portion 133a toward an outer side in the radial direction of the cylinder 40 and which comes into contact with an upper end of the spring 25, a second recessed portion 133c (a recessed portion 133c) which is formed on an outer periphery of the spring receiving main body 133b and is recessed toward the axis CL1, and a claw portion 133d which extends downward from a lower end of the base portion 133a and of which a lower end is formed into a claw shape.

The adjustment unit 60C includes the sensor 90C which detects a position of the spring receiving portion 133. The sensor 90C includes a guide portion 98C which guides the core portion 97. A position and the like where the guide portion 98C is disposed are the same as those of the guide portion 98 described above (see FIGS. 3 to 5), and detailed description thereof will be omitted.

The coupling member 140 includes an enlarged diameter portion 141 which is continuously enlarged in diameter from a lower end of the core portion 97, a large diameter portion 142 which is continuous from the enlarged diameter portion 141 and has a diameter larger than the diameter of the core portion 97, and a second flange portion 143 (a protruding portion 143) which is formed so as to continuously protrude in a circumferential direction of the large diameter portion 142. The coupling member 140 is formed integrally with the core portion 97, and is a member separate from the spring receiving portion 133.

There is a small gap between the second flange portion 143 and the second recessed portion 133c, which allows members to rotate relative to each other.

The shock absorber 20C having the configuration described above also achieves the predetermined effects of the present invention.

Further, the spring receiving portion 133 includes the second recessed portion 133c over a circumferential direction, and the second recessed portion 133c is formed into a recessed shape toward a center of the spring receiving portion 133 on an outer circumferential edge of the spring receiving portion 133.

The coupling member 140 includes the second flange portion 143 which protrudes toward the second recessed portion 133c and of which a tip end faces the second recessed portion 133c.

The core portion 97 is held by the second recessed portion 133c via the second flange portion 143.

In the shock absorber 20C, the second flange portion 143 extends to the second recessed portion 133c. Accordingly, the rotation of the spring receiving portion 133 around the axis CL1 can be allowed with a simple configuration. As a result, it is possible to provide the shock absorber 20C which can appropriately displace the core portion 97 while preventing a load from being applied to the core portion 97.

Although a case where the shock absorber according to the present invention is applied to a twin-shock type rear cushion has been described in the embodiments described above, the shock absorber according to the present invention is not limited to such examples. The shock absorber according to the present invention is also applicable to a mono-shock type rear cushion, an inverted front fork, and an upright front fork. That is, the shock absorber according to the present invention is not limited to the twin-shock type rear cushion.

Furthermore, the shock absorber according to the present invention is applicable not only to a two-wheel vehicle but also to a three-wheel vehicle, a buggy, and the like. That is, the present invention can be mounted on a straddle type vehicle other than a two-wheel vehicle.

In the shock absorber according to the present invention, the core portion 97 and the coupling members 100 and 140 may be configured to be rotatable around the axis CL2.

The present invention is not limited to the embodiments as long as the functions and effects of the present invention can be exhibited.

The shock absorber according to the present invention is suitable for a rear cushion of a straddle type vehicle.

The invention claimed is:

1. A shock absorber comprising:
   a cylinder provided with a piston which is movable along an axis inside the cylinder;
   a spring provided coaxially with the cylinder;
   a receiving member receiving the spring and provided to be movable in an axial direction of the cylinder;
   a sensor configured to detect a position of the receiving member; and
   a coupling member coupling the receiving member and the sensor, allowing rotation of the receiving member around the axis, and allowing a movement of the sensor along the axial direction, wherein:
   the sensor includes
   a coil portion formed by winding a conductive wire, a movement of the coil portion being restricted, and
   a core portion being movable along the axis together with the coupling member, at least a part of the core portion facing an inner side of the coil portion;
   the coupling member is formed integrally with the core portion; and
   a recessed portion is formed in one of the receiving member and the coupling member, a protruding portion facing the recessed portion is formed in the other one of the receiving member and the coupling member, and the receiving member and the coupling member are coupled to each other via the recessed portion and the protruding portion.

2. The shock absorber according to claim 1, wherein:
   the receiving member includes a first flange portion which is the protruding portion formed into an annular shape around the axis;
   the coupling member includes a first recessed portion which is the recessed portion formed into a recessed shape to surround an outer edge of the first flange portion; and
   the core portion is held by the first flange portion via the first recessed portion.

3. The shock absorber according to claim 1, wherein:
   the receiving member includes a second recessed portion over a circumferential direction, the second recessed portion being the recessed portion formed into a recessed shape toward a center on an outer circumferential edge of the receiving member;

the coupling member includes a second flange portion being the protruding portion, protruding toward the second recessed portion, and a tip end of the coupling member facing the second recessed portion; and
the core portion is held by the second recessed portion via the second flange portion.

4. The shock absorber according to claim 1, wherein the sensor is disposed outside the cylinder.

5. The shock absorber according to claim 1, wherein the core portion has a circular cross-sectional shape whose normal direction is an axial direction of the core portion.

6. The shock absorber according to claim 1, wherein:
the sensor includes a guide portion configured to guide a movement of the core portion along the axial direction of the core portion; and
the core portion is disposed between the guide portion and the cylinder.

7. The shock absorber according to claim 6, wherein:
the guide portion is disposed at a distance apart from the receiving member; and
the distance is smaller than a diameter of the core portion in a radial direction of the cylinder.

8. A shock absorber comprising:
a cylinder provided with a piston which is movable along an axis inside the cylinder;
a spring provided coaxially with the cylinder and provided outside the cylinder;
a receiving member disposed outside the cylinder, receiving the spring, provided to be movable in an axial direction, and including a flange portion formed into an annular shape around the axis;
a sensor disposed outside the cylinder and configured to detect a position of the receiving member; and
a coupling member coupling the receiving member and the sensor, including a recessed portion formed to surround an outer edge of the flange portion to allow rotation of the receiving member around the axis, and allowing a movement of the sensor along the axial direction, wherein:
the sensor includes
a coil portion formed by winding a conductive wire, and disposed outside the cylinder, a movement of the coil portion being restricted,
a core portion having a circular cross-sectional shape whose normal direction is an axial direction of the core portion, integrally formed with the coupling member, and being movable along the axis, at least a part of the core portion facing an inner side of the coil portion, and
a guide portion disposed to sandwich the core portion together with the cylinder and guiding a movement of the core portion along the axial direction of the core portion.

9. A shock absorber comprising:
a cylinder provided with a piston which is movable along an axis inside the cylinder;
a spring provided coaxially with the cylinder and provided outside the cylinder;
a receiving member disposed outside the cylinder, receiving the spring, provided to be movable in an axial direction, and including a recessed portion formed into a recessed shape toward the axis;
a sensor disposed outside the cylinder and configured to detect a position of the receiving member; and
a coupling member coupling the receiving member and the sensor, including a flange portion, a tip end of the flange portion protruding to face the recessed portion to allow rotation of the receiving member around the axis and allow a movement of the sensor along the axial direction, wherein:
the sensor includes,
a coil portion formed by winding a conductive wire, and disposed outside the cylinder, a movement of the coil portion being restricted,
a core portion having a circular cross-sectional shape whose normal direction is an axial direction of the core portion, integrally formed with the coupling member, and being movable along the axis, at least a part of the core portion facing an inner side of the coil portion, and
a guide portion disposed to sandwich the core portion together with the cylinder and guiding a movement of the core portion along the axial direction of the core portion.

10. The shock absorber according to claim 2, wherein the sensor is disposed outside the cylinder.

11. The shock absorber according to claim 2, wherein the core portion has a circular cross-sectional shape whose normal direction is an axial direction of the core portion.

12. The shock absorber according to claim 2, wherein:
the sensor includes a guide portion configured to guide a movement of the core portion along the axial direction of the core portion; and
the core portion is disposed between the guide portion and the cylinder.

13. The shock absorber according to claim 12, wherein:
the guide portion is disposed at a distance apart from the receiving member; and
the distance is smaller than a diameter of the core portion in a radial direction of the cylinder.

14. The shock absorber according to claim 3, wherein the sensor is disposed outside the cylinder.

15. The shock absorber according to claim 3, wherein the core portion has a circular cross-sectional shape whose normal direction is an axial direction of the core portion.

16. The shock absorber according to claim 3, wherein:
the sensor includes a guide portion configured to guide a movement of the core portion along the axial direction of the core portion; and
the core portion is disposed between the guide portion and the cylinder.

17. The shock absorber according to claim 16, wherein:
the guide portion is disposed at a distance apart from the receiving member; and
the distance is smaller than a diameter of the core portion in a radial direction of the cylinder.

18. The shock absorber according to claim 4, wherein the core portion has a circular cross-sectional shape whose normal direction is an axial direction of the core portion.

19. The shock absorber according to claim 4, wherein:
the sensor includes a guide portion configured to guide a movement of the core portion along the axial direction of the core portion; and
the core portion is disposed between the guide portion and the cylinder.

20. The shock absorber according to claim 19, wherein:
the guide portion is disposed at a distance apart from the receiving member; and the distance is smaller than a diameter of the core portion in a radial direction of the cylinder.

\* \* \* \* \*